US 6,616,538 B2

(12) United States Patent
Perrow

(10) Patent No.: US 6,616,538 B2
(45) Date of Patent: Sep. 9, 2003

(54) CONSTANT VELOCITY STROKING JOINT

(75) Inventor: Scott Jay Perrow, Freeland, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/785,569

(22) Filed: Feb. 16, 2001

(65) Prior Publication Data
US 2001/0049309 A1 Dec. 6, 2001

Related U.S. Application Data
(60) Provisional application No. 60/182,767, filed on Feb. 16, 2000.

(51) Int. Cl.[7] ............................................. F16D 3/227
(52) U.S. Cl. ..................................... 464/146; 464/906
(58) Field of Search ................................. 464/146, 167, 464/906

(56) References Cited

U.S. PATENT DOCUMENTS

| | | | |
|---|---|---|---|
| 3,452,558 A | * | 7/1969 | Cull et al. ................... 464/146 |
| 3,789,626 A | * | 2/1974 | Girguis ........................ 464/146 |
| 4,027,927 A | * | 6/1977 | Turner ..................... 464/146 X |
| 4,511,346 A | | 4/1985 | Hazebrook et al. |
| 4,573,947 A | | 3/1986 | Hazebrook et al. |
| 5,106,343 A | | 4/1992 | Sakaguchi et al. |
| 5,692,961 A | * | 12/1997 | Turner ........................ 464/146 |

* cited by examiner

Primary Examiner—Greg Binda
(74) Attorney, Agent, or Firm—Edmund P. Anderson

(57) ABSTRACT

A constant velocity stroking joint includes a housing having an inner cylindrical surface formed with axial guide channels aligned with guide channels of an inner race to provide axial ball tracks for a set of spherical balls. A double offset outer cage has a part-spherical outer diameter surface and a spherical inner diameter surface with centers of curvature axially offset from a center plane of the balls on opposite side thereof to provide constant velocity. An intermediate cage is provided between the inner race and outer cage having a spherical outer diameter surface with a radius of curvature matching that of the mating surface of the outer cage for maintaining constant velocity. The intermediate cage has a cylindrical inner diameter surface mating with a cylindrical outer diameter surface of the inner race, enabling the inner race to stroke axially of the outer cage with low friction, low load rolling action of the balls along the ball tracks while maintaining a constant velocity characteristic for all axial stroke conditions.

7 Claims, 6 Drawing Sheets

CONSTANT VELOCITY STROKING JOINT

CROSS-REFERENCE TO RELATED APPLICATIONS

This application is based upon, and claims the benefit of U.S. Provisional Patent Application No. 60/182,767, filed Feb. 16, 2000, the disclosure of which is incorporated by reference herein in its entirety.

BACKGROUND OF THE INVENTION

1. Technical Field

This invention relates to constant velocity stroking joints.

2. Related Art

Constant velocity stroking joints ("C/V joints") have particular application in front wheel drive systems for automotive vehicles. Power is transmitted from the transmission to the drive wheels via shaft assemblies. The shaft assemblies include C/V joints at their inboard and outboard ends. The inboard C/V joint is coupled to the transmission and the outboard C/V joint is coupled to the drive wheels. During normal operation of a front wheel drive vehicle, the wheels move up and down, and thus provision must be made for both angular and axial movement of the shaft assembly. So-called "jounce" and "rebound" imparted by the vehicle suspension system further necessitates the need for axial stroking or plunging capability of the shaft assemblies.

In a typical front wheel drive system, the outboard C/V joints are designed to accommodate large joint angularity but no axial stroking, whereas the inboard C/V joints exhibit less joint angularity but can stroke axially.

A typical inboard stroking C/V joint for front wheel drive applications includes an outer housing formed with a plurality of circumferentially spaced axial guide channels on its inner surface that align with corresponding axial guide channels of an inner race to define tracks for torque-transmitting balls. The race is adapted to mount on one end of a rigid shaft that is coupled at its opposite end to the outboard C/V joint. An outer cage disposed between the housing and inner race is formed with a plurality of ball pockets in which the balls are received. The outer diameter surface of the cage is in part spherical and engages the inner wall of the housing. The inner diameter surface of the cage is spherical and mates with a corresponding spherical outer diameter surface of the inner race. The inner and outer spherical surfaces have centers of curvature which are offset axially from a center plane of the balls on opposite sides thereof (so-called "double offset" cage). Such enables angular movement of the joint while maintaining a constant velocity characteristic.

In such a joint construction, axial stroking is achieved by conjoint axial movement of the inner race and outer cage relative to the outer housing. However, the balls are restrained against rolling movement by the cage, and thus axial stroking requires the balls to skid along the guide channels, which is a cause for unwanted friction, potential noise, and high loading.

It has been proposed to provide limited rolling of the balls in an effort to alleviate the above concerns, but at the expense of disrupting the true constant velocity characteristic of the joints. Full rolling of the balls through the full length of the axial stroke under normal operating conditions is also not achieved by the known proposals, thus offering only a partial solution to the problem. U.S. Pat. Nos. 4,511,346 and 4,573,947 for example disclose double offset joints formed with a large radius spherical profile on the inner surface of the cage that mates with a relatively smaller radius spherical outer surface of the inner race. The mismatch in size of the mating spherical surfaces enables the inner race to move axially relative to the outer cage by a small amount disclosed to be in the range of about 0.5 to 1.5 mm. It is further disclosed that the axial movement of the inner race must be carefully controlled in order to avoid disrupting the torsional characteristics of the joint. It will be appreciated that shifting the inner race axially has the effect of shifting the working center of curvature or pivot location of the mating spherical surfaces of the inner race and outer cage axially toward or away from the ball center plane, which in turn disrupts the true constant velocity characteristic of the joint.

U.S. Pat. No. 5,106,343 takes a similar approach of permitting a small amount of axial shifting to occur between the inner race and outer cage by altering the geometry of the mating surfaces such that they do not truly compliment one another. A small cylindrical surface region is provided along the otherwise spherical inner diameter surface of the outer cage. The outer diameter surface of the inner race remains spherical and now mismatched with respect to the mating surface of the outer cage, permitting the inner race to shift axially relative to the outer cage by a very small amount. This construction shares the same disadvantages as those discussed above with respect to the '346 and '947 patents.

The present invention overcomes or greatly minimizes the foregoing disadvantages of prior art C/V joints.

SUMMARY OF THE INVENTION AND ADVANTAGES

A constant velocity stroking joint comprises a housing having a generally cylindrical inner surface formed with a plurality of circumferentially spaced guide channels therein extending axially of the housing. An inner race has an outer surface formed with a plurality of circumferentially spaced, axially extending guide channels aligned with the guide channels of the housing to define a plurality of ball tracks. A plurality of torque-transmitting balls are disposed within the ball tracks. An outer cage is disposed between the inner race and the housing and is formed with a plurality of ball pockets in which the balls are received. The outer cage has an outer diameter surface that is at least in part spherical engaging the inner surface of the housing to enable the outer cage to move angularly relative to the housing.

According to a characterizing feature of the invention, an intermediate cage is provided between the outer cage and the inner race. The intermediate cage and the outer cage have mating outer and inner diameter spherical surfaces, respectively, which cooperate to permit the intermediate cage and the inner race to move as a unit angularly relative to the outer cage. An inner diameter surface of the inner race mates with an outer diameter surface of the intermediate cage configured to permit the inner race to stroke axially relative to the intermediate cage.

One advantage of the present invention is that the axial displacement of the inner race relative to the outer race enables the balls to roll freely in their ball tracks throughout the full axial stroke of the joint during normal operating conditions, avoiding frictional skidding of the balls which greatly decreases axial loading, friction, and noise. Under severe conditions, further stroking through axial skidding is permitted.

The invention has the further advantage of attaining such low friction axial stroking of the joint without sacrificing the true constant velocity characteristic of the joint. The constant velocity characteristic is preserved by provision of the mating spherical contact surfaces between the intermediate race and outer race, which maintain the balanced centers of curvature for all joint angles and axial stroke conditions of the joint.

BRIEF DESCRIPTION OF THE DRAWINGS

Presently preferred embodiments of the invention are disclosed in the following description and in the accompanying drawings, wherein.

DETAILED DESCRIPTION

Figure 1:
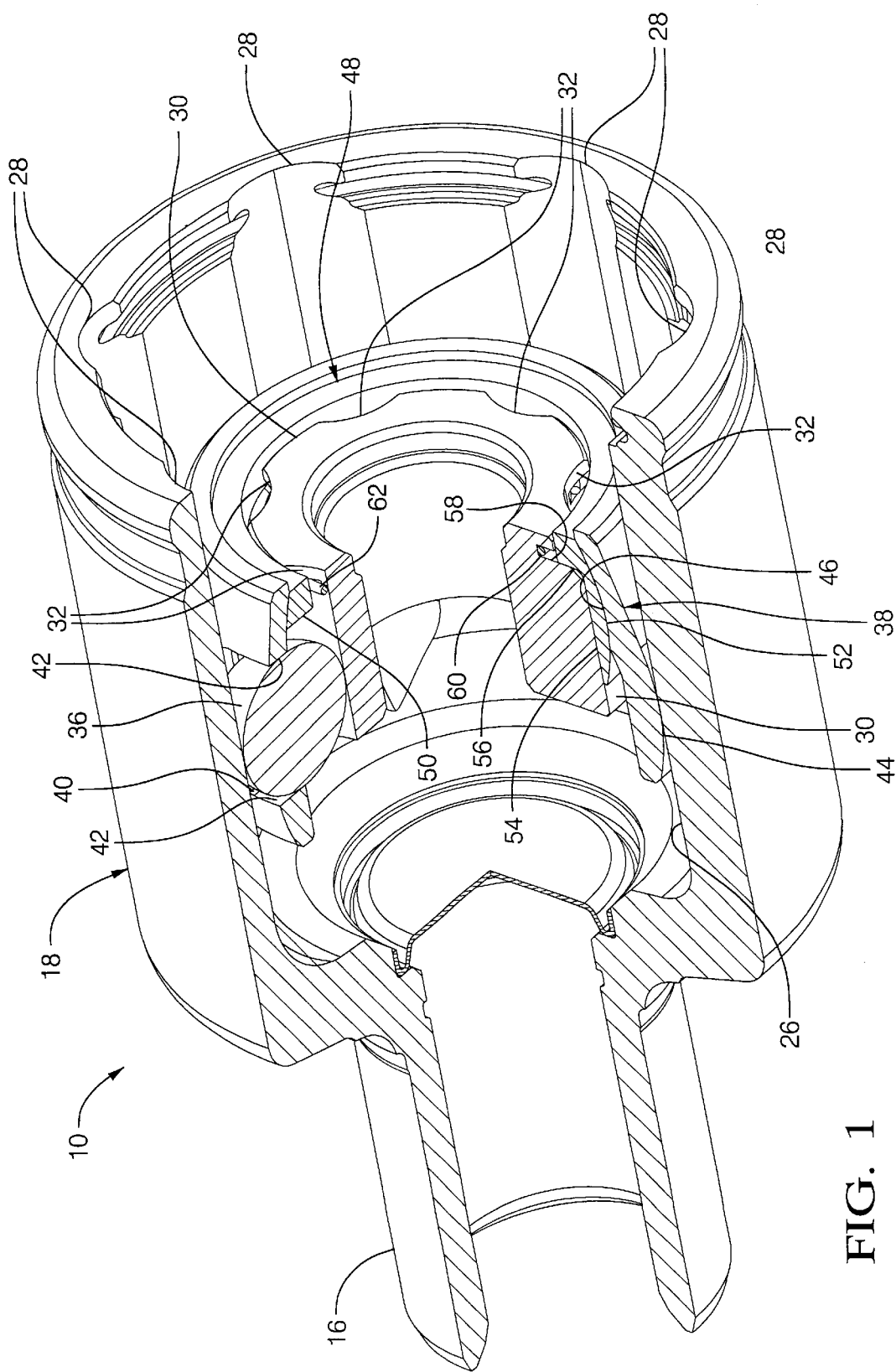
FIG. 1 is a perspective view of a C/V stroking joint assembly constructed according to a presently preferred embodiment of the invention, shown partly broken away and in section.
Figure 2:
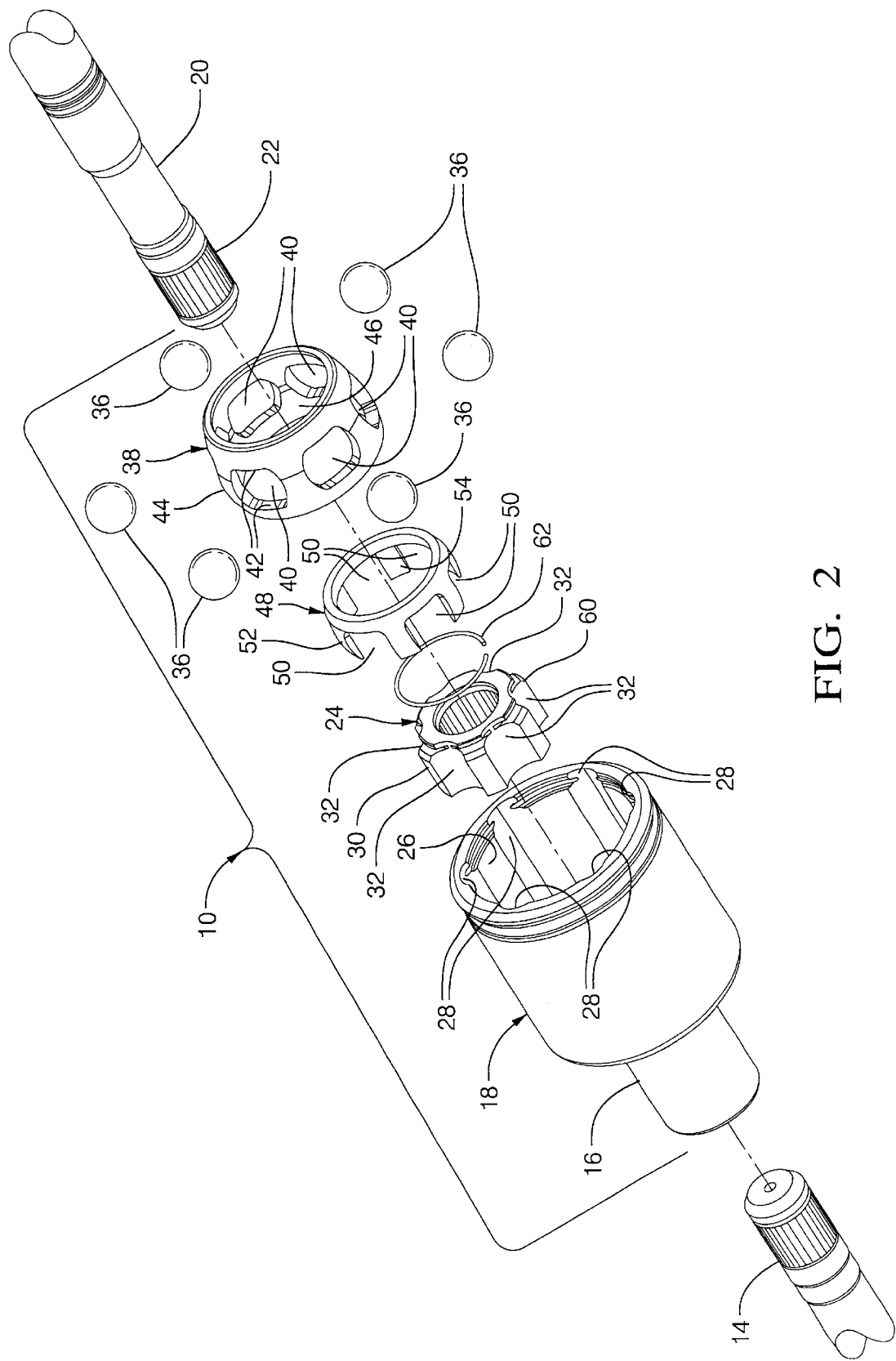
FIG. 2 is an exploded perspective view of the C/V joint of FIG. 1 shown together with mating components of a front wheel drive system of a vehicle.

Referring now to the drawings, a constant velocity (C/V) stroking joint assembly constructed according to a presently preferred embodiment of the invention is indicated generally at 10 in FIG. 1 and is particularly adapted for use in a front wheel drive system of an automotive vehicle which includes, as illustrated in FIG. 2, an externally splined driving shaft 14 extendable into an internally splined collar 16 provided at one axial end of an outer housing 18 of the joint assembly 10, and a driven shaft 20 coupled at one externally splined end 22 to an internally splined inner race 24 of the assembly 10 supported within the housing 18, the shaft 20 being fixed axially relative to the inner race 24. The shaft 20 is coupled at its axially opposite end (not shown) to another C/V joint (not shown) which in a vehicle front wheel drive system would be an outboard C/V joint.

The housing 18 of the C/V joint 10 has an inner diameter wall surface 26 that is generally cylindrical and formed with a plurality of circumferentially spaced guide channels 28 extending in the axial direction of the housing 18 in parallel relation to one another.

The inner race 24 has an outer diameter surface 30 that is likewise formed with a plurality of circumferentially spaced, axially extending guide channels 32 that are aligned with and spaced radially inwardly of the guide channels 28 to define a plurality of axial ball tracks 34 in which a corresponding plurality of spherical torque-transmitting balls 36 are disposed and rollable therealong. There are six such ball tracks 34 and balls 36 in the illustrated embodiment.

The assembly 10 further includes an outer cage 38 disposed between the inner race 24 and the housing 18. The outer cage 38 is formed with a plurality of axially spaced apertures or ball pockets 40 in which the balls 36 are received and restrained axially by end walls 42 thereof. The outer cage 38 has an outer diameter surface 44 that is at least in part spherical and disposed in contacting engagement with the cylindrical inner surface 26 of the housing 18. The outer diameter surface 44 has a center of curvature $C_1$ which is axially shifted with respect to a central plane P passing through the centers of the balls 36.

Figure 4:
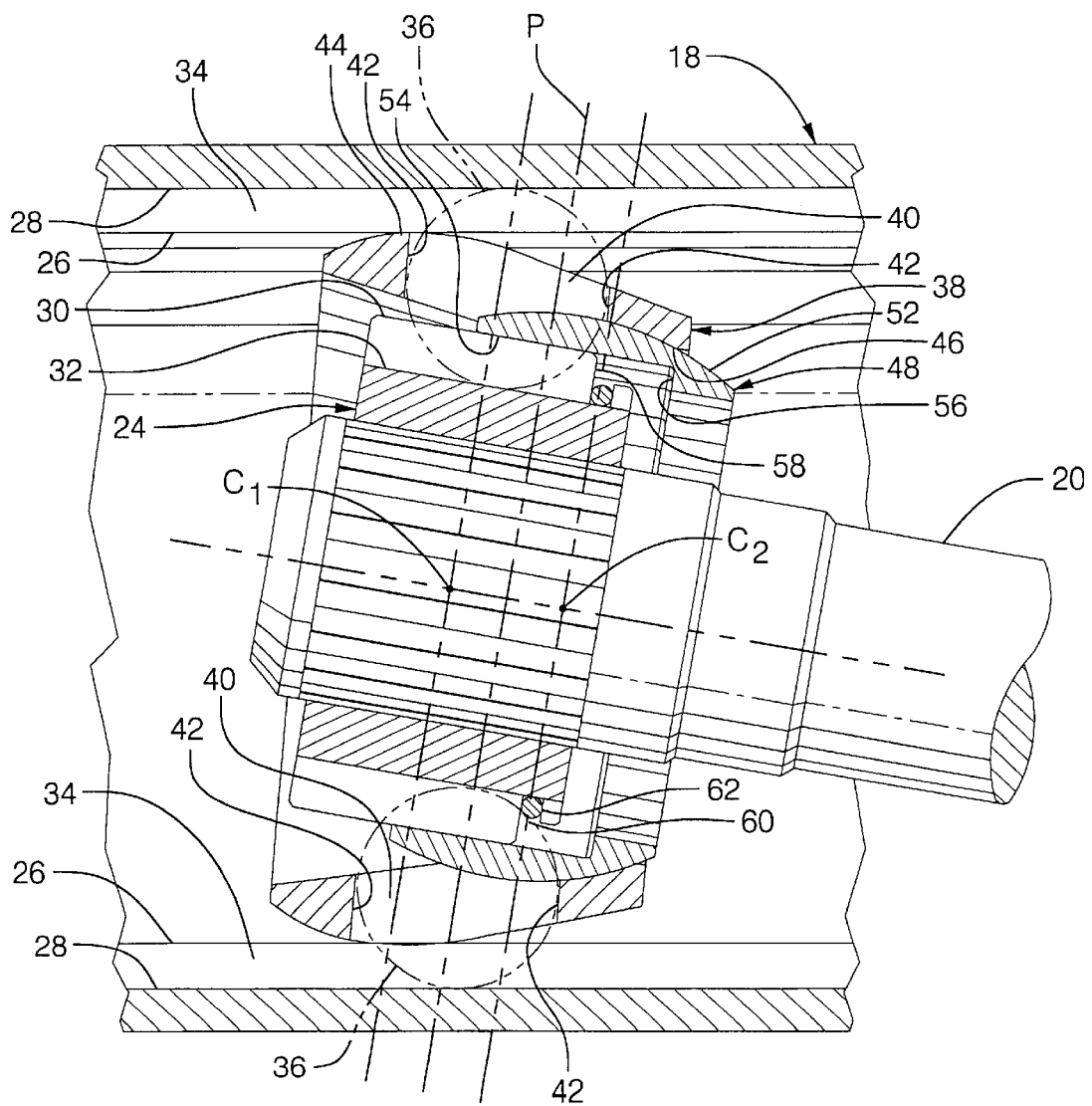
FIG. 4 is an enlarged view like FIG. 3, but with the joint shown in a large joint angle and maximum inward axial stroke condition.

The outer cage 38 also has an inner diameter surface 46 that is substantially spherical and preferably truly spherical and offset axially from the outer diameter surface 44 of the outer cage 38 in such manner as to provide a center of curvature $C_2$ spaced axially from the center plane P of the balls 36 at a distance equal that of $C_1$, as best shown in FIG. 4.

According to the invention, the joint assembly 10 further includes an intermediate cage 48 disposed between the inner race 24 and outer cage 38 and formed separately from each. The intermediate cage 48 includes a plurality of axially elongated, open-ended ball slots 50 accommodating the balls 36. The intermediate cage 48 has an outer diameter surface 52 that is substantially spherical and preferably truly spherical with a radius of curvature that is preferably equal to that of the radius of curvature of the mating surface 46 of the outer cage 38, such that there it continuous spherical contact of the mating surfaces 46, 52 during angular and axial movements of the joint 10. The matched spherical surfaces 46 and 52 effectively lock the intermediate cage 48 against axial shifting or movement relative to the outer cage 38, while allowing relative angular movement therebetween. Fixing the intermediate cage 48 axially relative to the outer cage 38 assures that the pivot location or center of curvature $C_2$ of the mating surfaces 46, 52 remains axially offset from the center plane P of the balls at a distance equal to that of the offset of $C_1$, so as to maintain a true constant velocity characteristic of the joint which occurs when the centers of curvatures of the outer 44 and inner 46 diameter contact surfaces of the outer cage 38 are equally spaced on opposite axial sides of the ball center plane P.

The intermediate cage 48 has an inner diameter surface 54 that mates with the outer diameter surface 30 of the inner race 24, and the two are configured in such manner as to enable the inner race 24 to move axially relative to the intermediate cage 48. In the preferred embodiment, the mating surfaces 30, 54 are substantially cylindrical.

Figure 3:
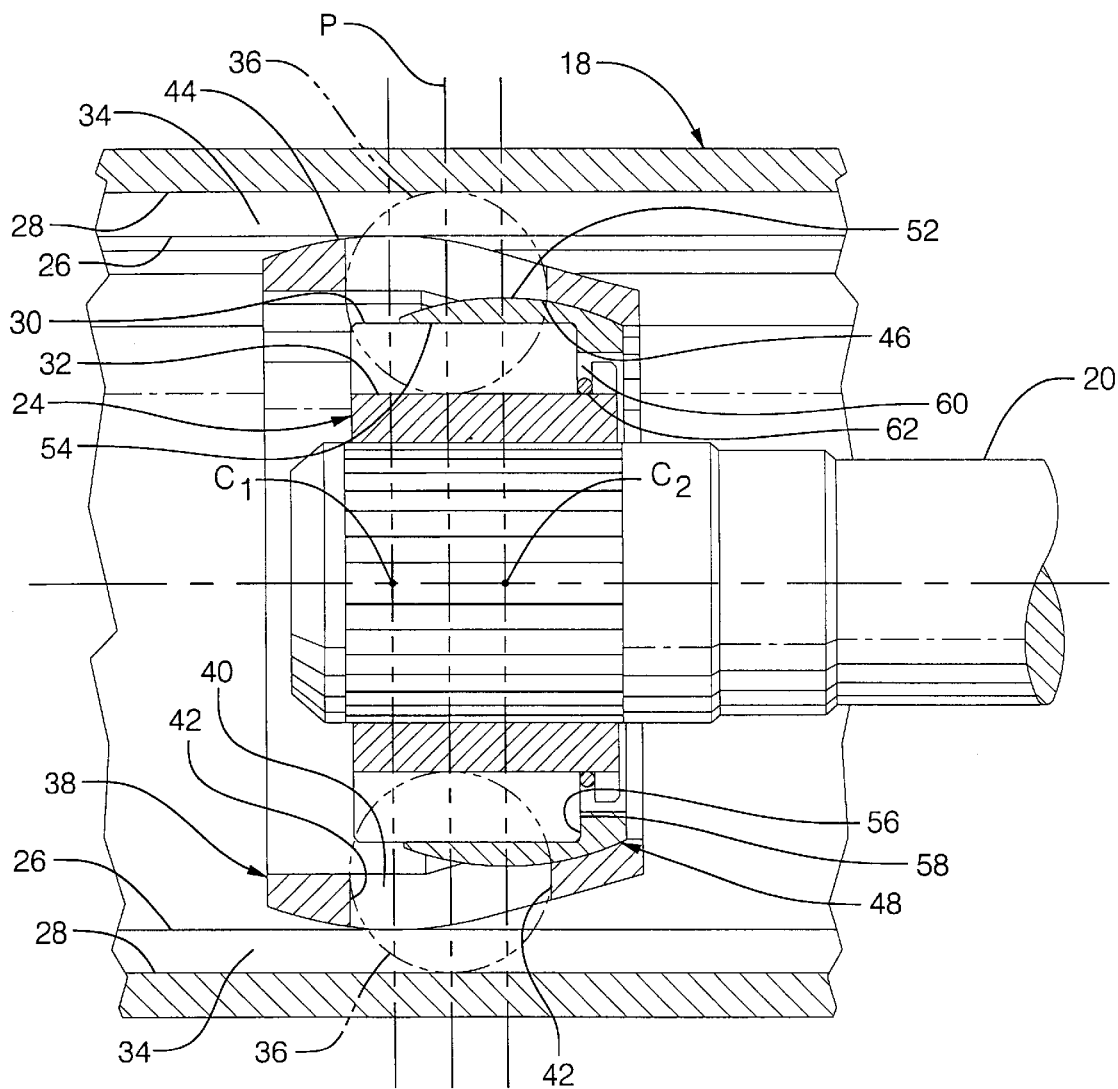
FIG. 3 is a longitudinal fragmentary sectional view of the C/V joint of FIG. 1 shown in a zero joint angle and maximum outward axial stroke condition.

As the inner race 24 strokes axially relative to the fixed housing 18, the balls 36 roll in their ball tracks 34, providing low load, low friction axial stroking of the joint assembly 10. FIG. 3 shows a condition of maximum outward axial stroking of the inner race 24 and FIG. 4 shows a condition of maximum inward stroking. It will be appreciated that the axial displacement of the inner race 24 has no effect on the constant velocity characteristics of the joint, as the $C_1$ and $C_2$ positions remain the same.

The outward axial stroking of the inner race 24 is limited by the confrontation of abutting surfaces of the inner race 24 and intermediate cage 48. As shown best in FIG. 3, the intermediate cage 48 is formed on its inner diameter with a shoulder 56 adjacent its axially outer end which confronts a corresponding shoulder 58 of the inner race 24 when stroked outwardly to define a maximum outwardly stroked condition.

Confronting surfaces similarly limit the inward stroke of the inner race 24. As shown best in FIG. 4, the inner race 24 is formed with a circumferential groove 60 in which a retaining ring 62 is accommodated. The ring 62 extends across the guide channels 32 in the path of the balls 36 so as to confront the balls 36 to establish an inward stroke limit, wedging the balls 36 outwardly and precluding free rolling movement of the balls 36 in the tracks 34. Any further axial inward movement of the inner race 24 would require conjoint movement of the remaining inner components and skidding of the balls 36 along the ball tracks 34.

The free rolling axial stroke provided by the intermediate cage 48 is on the order of about 14 mm, which is sufficient to account for the full range of axial stroking called for by most C/V joint applications during normal operating conditions. Under severe conditions, additional axial stroking is achieved through skidding of the inner components relative to the housing 18. The length of stroking can be varied if necessary by simply lengthening or shortening the inner race 24 and/or the axial spacing of the shoulder 56 and retaining ring 62 to meet the needs of a particular application.

Figure 5:
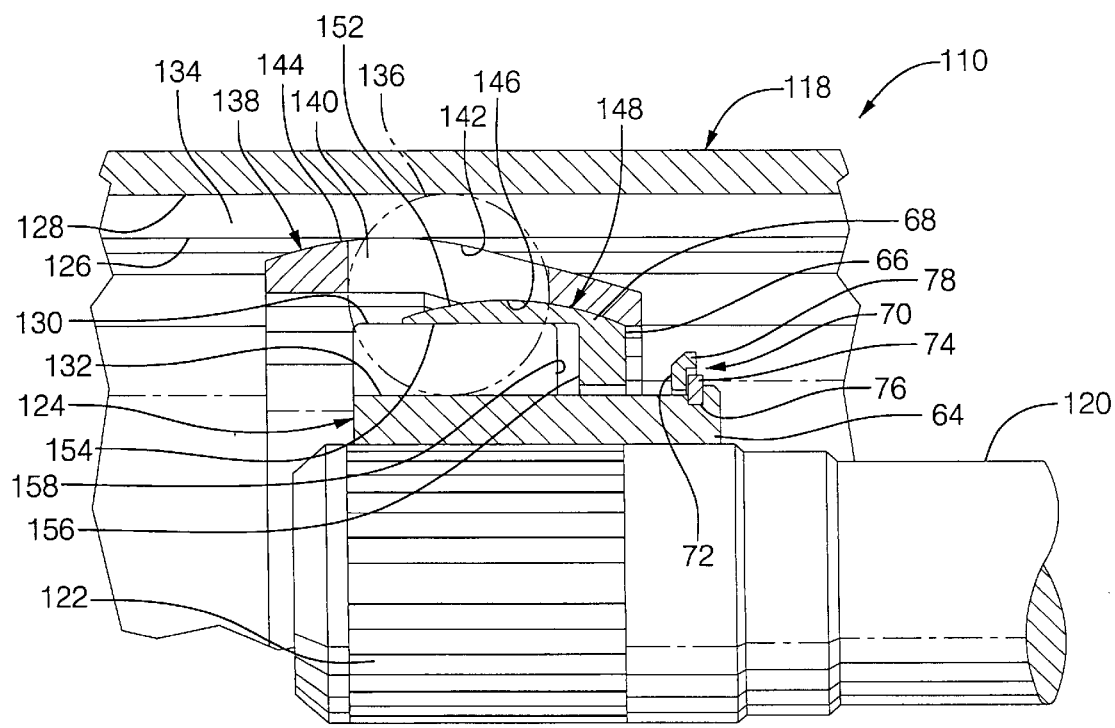
FIG. 5 is an enlarged fragmentary sectional view of a second embodiment of the invention.
Figure 6:
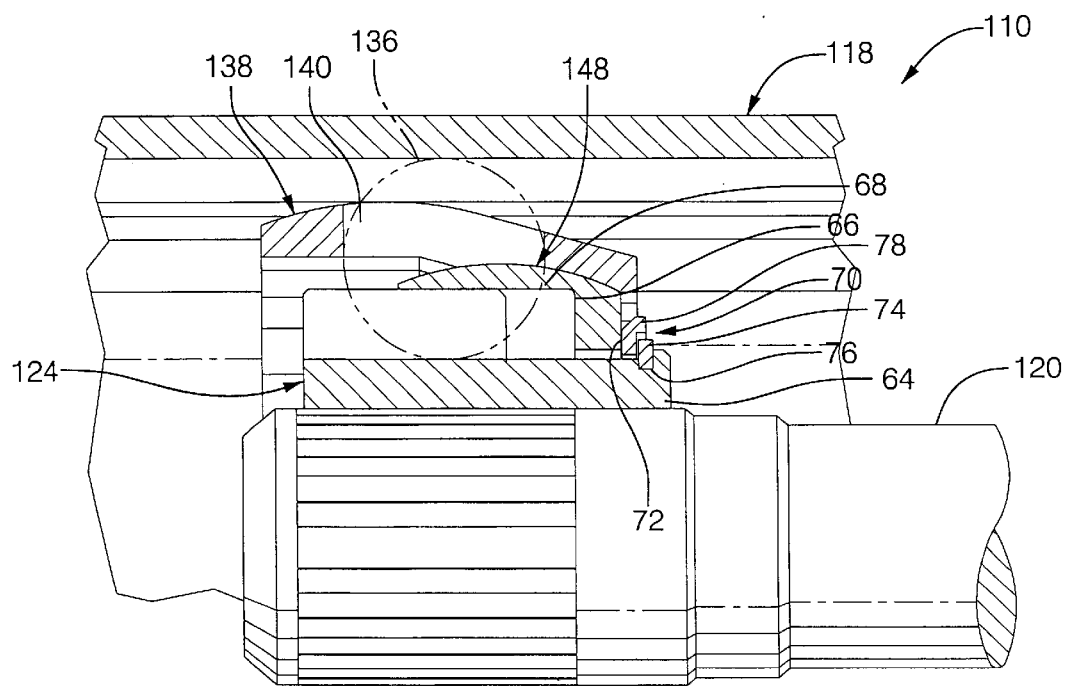
FIG. 6 is an enlarged fragmentary sectional view of the second embodiment of the invention.
Figure 7:
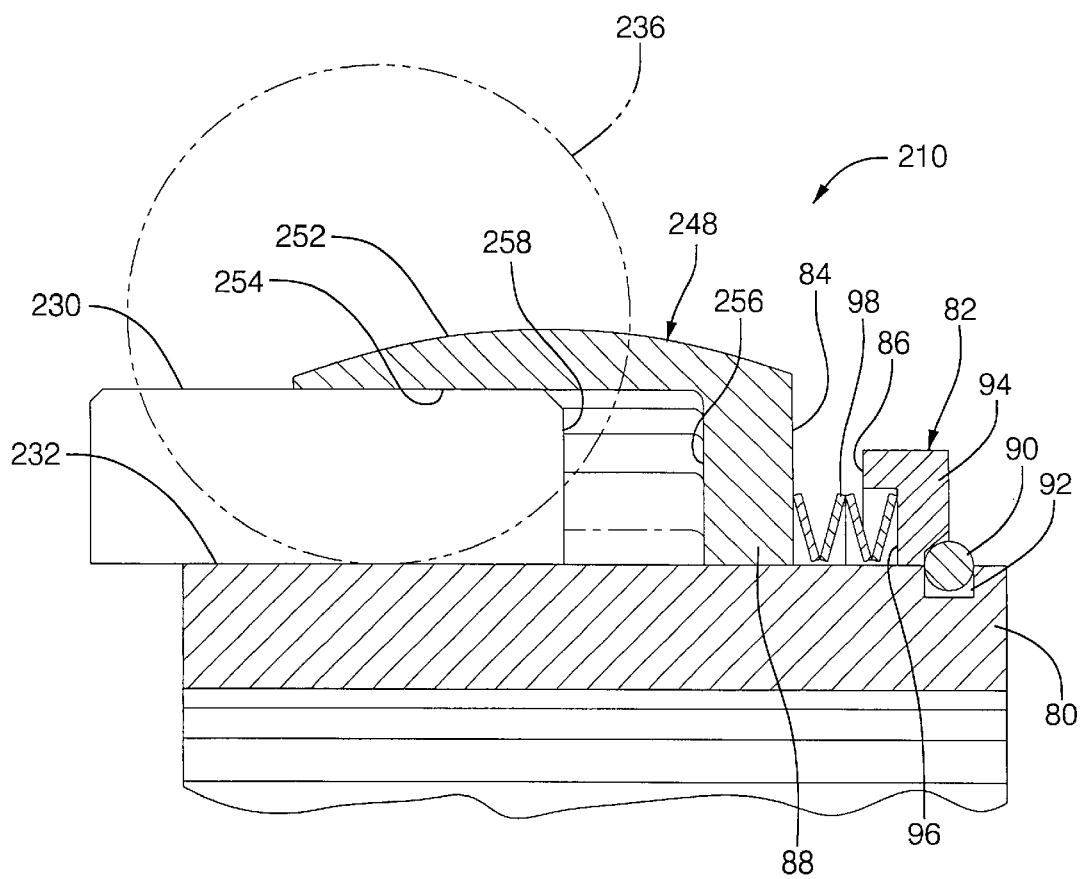
FIG. 7 is an enlarged fragmentary sectional view of a third embodiment of the invention.

FIGS. 5–7 show two alternative embodiments of the invention for controlling the inward axial stroke of the inner race in lieu of the interaction between the retaining ring 62 and balls 36 described above with reference to FIG. 4.

The embodiment of FIGS. 5 and 6 is much the same as the first embodiment of FIGS. 1–4, and thus the same reference numerals are used to represent like features, but are increased by 100. The inner race 124 has an axially outer section 64 projecting axially beyond an axially outer end face 66 of a radially inwardly projecting annular flange 68 of the intermediate cage 148. The inner race 124 includes a stop ring device 70 disposed axially outwardly of the flange 68 of the intermediate cage 148. The stop ring device 70 presents an axially inwardly facing abutment surface 72 in position to confront the end face or abutment surface 66 of the intermediate cage 148 during axial inward displacement of the inner race 124 relative to the intermediate cage 148, defining a maximum inward stroke limit of said inner race 124. The stop ring device 70 is spaced axially from the balls 136 through the full stroke of the inner race 124 and thus the balls 136 do not encounter any obstruction in this embodiment to limit inward stroke. The flange 68 is disposed axially between said stop ring device 70 and said balls 136.

The stop ring device 70 includes a snap ring 74 installed in an annular groove 76 of the inner race 124, and preferably a stopper ring 78, on which the abutment surface 72 is provided.

Referring to FIG. 7, the same reference numerals are used to designate like features of the first embodiment of FIGS. 1–4, but are offset by 200. The inner race 248 is like FIG. 5 in that it includes an axially outer section 80 carrying a stop ring device 82 which has an axially inner abutment surface 84 positioned to confront an end face abutment surface 86 of a radially inwardly extending flange 88 of the intermediate cage 248 to define a maximum inward stroke limit of the inner race 224 in the same manner described above with respect to the embodiment of FIG. 5.

The stop ring device 82 includes a snap ring 90 installed in an annular groove 92 of the inner race 224, and preferably a stopper ring 94 on which the abutment surface 84 is provided. The stopper ring 94 has a pocket or recess 96 extending axially outwardly of the abutment surface 84. A spring 98 is accommodated in the pocket 96 and extends axially beyond the abutment surface 84 when in a relaxed state. The spring 98 may comprise one or more Belleville washers, a coil spring, or the like. As the inner race 224 is plunged inwardly, the flange 88 first confronts the spring 98 and then compresses the spring axially as the stopper ring 94 moves toward the flange 88, until such point as the abutment surfaces 84, 86 meet. Energy is taken up by compression of the spring 98 which acts to cushion or soften the impact between the abutment surfaces 84, 86, for smoother operation of the joint 210.

The disclosed embodiments are representative of presently preferred forms of the invention, but are intended to be illustrative rather than definitive thereof. The invention is defined in the claims.

What is claimed is:

1. A constant velocity stroking joint assembly comprising:
   a housing having an inner surface formed with a plurality of circumferentially spaced guide channels extending axially of said housing;
   an inner race having an outer surface formed with a plurality of circumferentially spaced, axially extending guide channels aligned with said guide channels of said housing to provide a plurality of axial ball tracks;
   a plurality of torque-transmitting balls disposed within and rollable axially along said ball tracks in direct rolling contact with said ball tracks;
   an outer cage disposed between said inner race and said housing formed with a plurality of ball pockets in which said balls are received, said outer cage having an outer diameter surface that is at least in part spherical engaging said inner surface of said housing to permit said outer cage to move angularly relative to said housing;
   an intermediate cage disposed between said outer cage and said inner race, said intermediate cage and said outer cage having a mating outer and inner diameter surfaces, respectively, that are substantially spherical to permit relative angular movement therebetween, and said intermediate cage and said inner race having inner and outer diameter mating surfaces, respectively, configured to permit said inner race to stroke axially relative to said intermediate cage;
   an abutment shoulder provided on said inner race and a corresponding abutment shoulder provided on said intermediate cage in position to confront said abutment shoulder of said inner race in response to moving said inner race to an axially outer limit; and
   an annular ring groove formed on said inner race adjacent said abutment shoulder of said inner race, and an annular retaining ring disposed in said ring groove and extending into said guide channels of said inner race to confront said balls and disable rolling movement of said balls along said axial ball tracks in one axial direction in response to moving said inner race axially inwardly relative to said outer race to an axially inward limit of said inner race thereby binding said inner race against further axial inward movement.

2. The assembly of claim 1 wherein said intermediate cage is supported against relative axial movement relative to said outer cage.

3. The assembly of claim 2 wherein said outer diameter surface of said intermediate cage and said inner diameter surface of said outer cage have substantially the same radii of curvature.

4. The assembly of claim 3 wherein said inner and outer surfaces of said outer cage have centers of curvature spaced axially from a center plane of said balls on opposite axial sides thereof to provide a constant velocity characteristic of said assembly.

5. The assembly of claim 4 wherein said assembly maintains said constant velocity characteristic for all axial stroke and joint angle conditions of said assembly.

6. The assembly of claim 1 wherein said mating surfaces of said intermediate cage and said inner race are generally cylindrical.

7. The assembly of claim 1 wherein said intermediate cage includes a plurality of circumferentially spaced axially elongated ball slots accommodating said balls.

\* \* \* \* \*